US006319600B1

(12) United States Patent
Stirniman et al.

(10) Patent No.: US 6,319,600 B1
(45) Date of Patent: *Nov. 20, 2001

(54) FLUOROPOLYETHER TOPCOAT LUBRICANTS

(75) Inventors: Michael Joseph Stirniman; Samuel John Falcone, both of San Jose, CA (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/082,967

(22) Filed: May 22, 1998

Related U.S. Application Data (60) Provisional application No. 60/053,840, filed on Jul. 25, 1997.

(51) Int. Cl.$^7$ .............................. B01D 3/00; B32B 27/00; G11B 5/00
(52) U.S. Cl. ..................... 428/336; 428/421; 428/422; 428/694 TF; 203/99
(58) Field of Search ................... 428/694 TF, 921, 428/422, 336; 203/99

(56) References Cited

U.S. PATENT DOCUMENTS

| | | | |
|---|---|---|---|
| 5,292,585 | * 3/1994 | Ohnuki et al. | 428/336 |
| 5,562,965 | 10/1996 | Gui et al. | . |
| 5,741,577 | * 4/1998 | Yamamoto et al. | 428/212 |
| 6,099,937 | * 8/2000 | Gui et al. | 428/141 |

OTHER PUBLICATIONS

Del Pesco, T., "Perfluoroalkylpolyethers", *CRC Handbook of Lubrication and Tribology*, vol. III, Bosser, E.R., Ed., CRC Press, Boca Raton, Florida, U.S., 1994, pp. 287–303.
L. H. Sperling, Introduction to Physical Polymer Science, 2nd Ed., pp. 78–79, 1992.*

* cited by examiner

*Primary Examiner*—Paul Thibodeau
*Assistant Examiner*—Ramsey Zacharia
(74) *Attorney, Agent, or Firm*—McDermott, Will & Emery

(57) ABSTRACT

A high-fraction, terminally nonfunctional fluoropolyether lubricant topcoat is applied to a magnetic recording medium. The topcoat provides good stiction and wear properties at a low thickness.

22 Claims, 9 Drawing Sheets

FLUOROPOLYETHER TOPCOAT LUBRICANTS

RELATED APPLICATION

This application claims priority from provisional patent application Ser. No. 60/053,840 filed Jul. 25, 1997, entitled "FRACTIONATED NONFUNCTIONAL PERFLUOROPOLYETHERS FOR LUBRICATION OF LOW ROUGHNESS MEDIA AT LOW LUBRICANT THICKNESS" the entire disclosure of which is herein incorporated by reference.

TECHNICAL FIELD

The present invention relates to the recording, storage and reading of magnetic data, particularly rotatable magnetic recording media, such as thin film magnetic disks having textured surfaces and a lubricant topcoat for contact with cooperating magnetic transducer heads.

BACKGROUND ART

Thin film magnetic recording disks and disk drives are conventionally employed for storing large amounts of data in magnetizable form. In operation, a typical contact start/stop (CSS) method commences when a data transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too flat, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve mechanical polishing or laser texturing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers.

Figure 1:
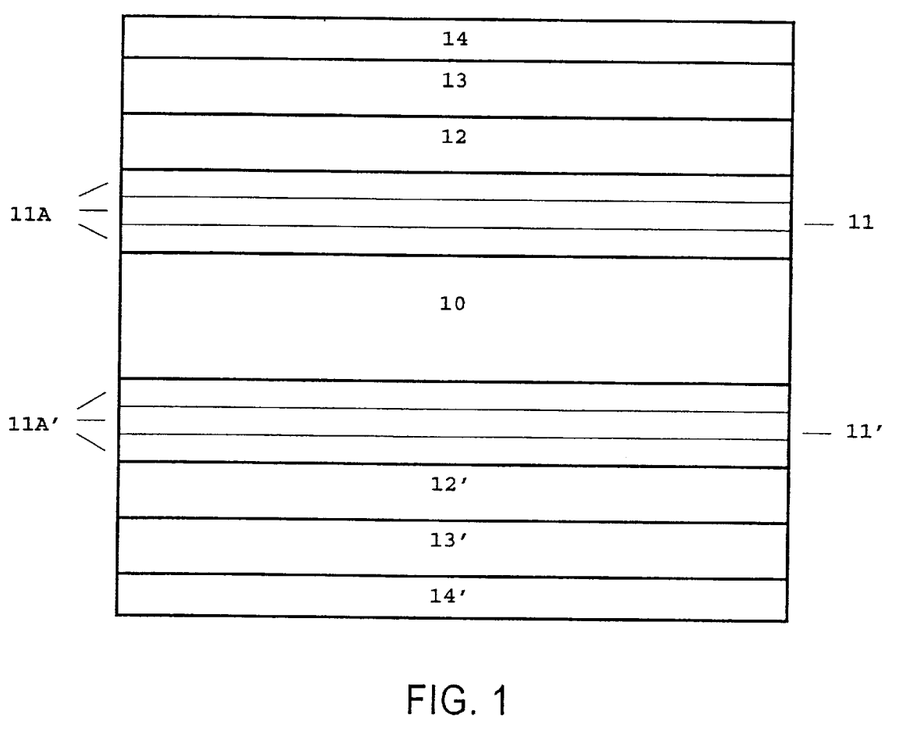
FIG. 1 schematically depicts a magnetic recording medium structure to which the present invention is applicable.

A typical longitudinal recording medium is depicted in FIG. 1 and comprises a substrate 10, typically an aluminum (Al)-alloy, such as an aluminum-magnesium (Al—Mg)-alloy, plated with a layer of amorphous nickel-phosphorus (NiP). Alternative substrates include glass, glass-ceramic materials and graphite. Substrate 10 typically contains sequentially deposited on each side thereof a chromium (Cr) or Cr-alloy underlayer 11, 11', a cobalt (Co)-base alloy magnetic layer 12, 12', a protective overcoat 13, 13', typically containing carbon, and a lubricant topcoat 14, 14'. Cr underlayer 11, 11' can be applied as a composite comprising a plurality of sub-underlayers 11A, 11A'. Cr underlayer 11, 11', Co-base alloy magnetic layer 12, 12' and protective overcoat 13, 13', typically containing carbon, are usually deposited by sputtering techniques performed in an apparatus containing sequential deposition chambers. A conventional Al-alloy substrate is provided with a NiP plating, primarily to increase the hardness of the Al substrate, serving as a suitable surface to provide a texture, which is substantially reproduced on the disk surface.

In accordance with conventional practices, a lubricant topcoat is uniformly applied over the protective layer to prevent wear between the disk and head interface during drive operation. Excessive wear of the protective overcoat, typically comprising carbon, increases friction between the head and disk, thereby causing catastrophic drive failure. Excess lubricant at the head-disk interface causes high stiction between the head and disk. If stiction is excessive, the drive cannot start and catastrophic failure occurs. Accordingly, the lubricant thickness must be optimized for stiction and friction.

Thus, a significant factor in the performance of recording media is the thickness of the topcoat lubricant. The lubricant topcoat is typically applied at a thickness no greater than necessary to maintain the requisite lubricity.

It is desirable to employ lubricants which form an effective functional topcoat at a thickness less than those conventionally employed for improved medium performance. Perfluoropolyether lubricants with one or more functionalized end-groups are conventionally employed for recording media topcoats. The functionalized end-groups of these compounds are believed necessary to improve adhesion of the lubricant topcoat to the recording media. It is also believed, however, that for functionalized perfluoropolyether lubricants to provide the requisite tribology, they must be applied at a relatively high topcoat thickness, particularly when the recording medium is expected to perform under high stress conditions.

Gui et al., in U.S. Pat. No. 5,562,965, disclose the use of terminally functionalized perfluoropolyether coatings of thin film disks. Gui et al. further teach that the functionalized perfluoropolyether lubricants have a molecular weight not more than 4 kD, preferably within the 2–3 kD range. It is also known that alcohol derivatized perfluoropolyether lubricants exhibit both high stiction and a rapid increase in dynamic friction or wear under conditions of high temperature and humidity.

Perfluoropolyether lubricants with nonfunctionalized end-groups are also known. However, such lubricants have not found significant use as disk lubricants since they suffer from poor wear resistance. Moreover, the components of commercially available terminally nonfunctional perfluoropolyether lubricants typically have wide and varying distributions of molecular weight.

In view of the criticality of the lubricant topcoat, there is a continuing need for improved lubricant stiction and wear performance, particularly under conditions of high temperature and humidity. There is also a need for lubricants which form functionally effective topcoats on recording media at a thickness less than conventional lubricant topcoats.

DISCLOSURE OF THE INVENTION

An object of the present invention is a magnetic recording medium comprising a lubricant topcoat thereon exhibiting good stiction and wear resistance.

Another aspect of the present invention is a method of manufacturing a magnetic recording medium having a lubricant topcoat exhibiting good stiction and wear resistance.

Additional objects, advantages and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a magnetic recording medium comprising a lubricant topcoat, wherein the lubricant comprises a high-fraction terminally nonfunctional fluoropolyether.

Another object of the present invention is a method of manufacturing a magnetic recording medium, the method comprising: depositing a magnetic layer on a substrate; and depositing a lubricant on the magnetic layer to form a lubricant topcoat, wherein the lubricant comprises a high-fraction, terminally nonfunctional fluoropolyether.

Additional objects and advantages of the present invention will become readily apparent to those having ordinary skill in the art from the following detailed description, wherein the embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

The present invention stems from the discovery that certain fluoropolyethers, when used as lubricant topcoats, lead to unexpected and considerable improvements in the performance of magnetic recording media. Lubricant topcoats according to the present invention comprise fractionated fluoropolyether lubricants having substantially relatively high molecular weight components. In accordance with embodiments of the present invention, relatively low molecular weight components are strategically removed from the fluoropolyether lubricant, particularly volatile low molecular weight components. Upon the removal of relatively low molecular weight components, the fluoropolyether lubricant comprises relatively higher molecular weight components, or a high-fraction.

The high-fraction fluoropolyether lubricants of the present invention comprise a composition of relatively high molecular weight components having an average molecular weight of at least about 4 kilo-Daltons (kD). Embodiments of the present invention include high-fraction fluoropolyether lubricants comprising a composition of higher molecular weight components having an average molecular weight of at least about 6 kD, e.g., an average molecular weight within the range of about 6 kD to about 30 kD.

Further, the high-fraction fluoropolyether lubricants of the present invention do not have reactive end-groups. In other words, the high-fraction fluoropolyether lubricants of the present invention comprise terminally nonfunctional end groups such as alkyl, haloalkyl, alkoxy, haloalkoxy, aryl, or haloaryl.

After extensive experimentation and investigation, it was surprisingly found that removing the lightest molecular weight components of terminally nonfunctional fluoropolyether lubricant by fractionation yields a lubricant capable of providing good stiction and wear properties at a very low topcoat thickness.

Given the disclosed objects of the present invention, the undesired low molecular weight components of a fluoropolyether lubricant can be removed employing conventional techniques. Fractionating a fluoropolyether lubricant, for example, can be achieved by distillation, solvent extraction, chromatography, e.g. (HPLC), or other molecular weight separation techniques.

It was found particularly effective to remove the relatively low molecular weight components of a fluoropolyether lubricant by distillation under reduced pressure. The lightest fraction is removed by distillation within the range of about 150° C. to about 290° C. and at a pressure of between about $10^{-2}$ to about $10^{-4}$ Torr. The remaining high-fraction fluoropolyether typically has a boiling point of greater than the temperature at which the lightest fraction was removed, e.g., greater than about 285° C. at a pressure of $10^{-3}$ Torr.

Embodiments of the present invention include lubricant homopolymers, random polymers or block polymers, i.e. the repeat units may be the same or different. In addition, different repeat units can be randomly distributed along the backbone of the polymer or distributed as a block of one type of repeat unit and subsequent blocks of different repeat units along the backbone of the polymer. The inventive lubricants can be completely fluorinated or partially fluorinated and can be linear or branched. High-fraction terminally nonfunctional fluoropolyether lubricants of the present invention have the formula:

$$A(R^1O)_x(R^2O)_y(R^3O)_zB;$$

wherein: A is alkyl, haloalkyl, alkoxy, haloalkoxy, aryl, or haloaryl;

B is alkyl, haloalkyl, aryl, or haloaryl;

$R^1$, $R^2$ and $R^3$ are independently $C_{1-10}$ fluoroalkyl, or $C_{1-10}$ perfluoroalkyl;

x is between about 10 to about 500; and y and z are independently 0 or up to about 200.

An embodiment of the present invention comprises compounds having the formula:

wherein: $R^1$ and $R^2$ are independently $C_{1-10}$ fluoroalkyl, or $C_{1-10}$, perfluoroalkyl; and n and m are individually between about 10 to about 500.

Another embodiment of the present invention comprise compounds of the formula:

wherein, q and p are individually between about 10 to about 500.

Terminally nonfunctional fluoropolyether lubricants of the present invention can be prepared by partially or completely fluorinating a polyalkylether or by polymerizing a fluorinated monomer. Alternatively, terminally nonfunctional fluoropolyether lubricants are commercially available under such trade names as Fomblin Z-03, Fomblin Z-15, Fomblin Z-25, Fomblin Z-60 (Ausimont), Demnum (Daikin) and Krytox (Dupont). The prepared or commercially available terminally nonfunctional fluoropolyether lubricants are strategically fractionated to provide high-fraction molecular weight lubricants of the present invention.

The lubricant topcoat of the present invention can be applied to a magnetic recording medium, either on the magnetic layer or on a conventionally applied protective overcoat, particularly a carbon overcoat. In an embodiment of the present invention, the lubricant is dissolved in a conventional hydrofluorocarbon solvent, perfluorocarbon solvent, hydrofluoroether solvent, or mixtures thereof, such as PF-5060 (3M Corp.), HFE-7100 (3M Corp.), Freon TA®, or Vertrel-XF (Dupont), in a ratio of about 0.0001% to about 100% by (weight/weight), by as much as about 0.01% to about 10%, e.g., about 0.1% to about 2%. A typical magnetic recording medium, for example, a composite comprising a non-magnetic substrate having sequentially deposited on each side thereof an underlayer, a magnetic layer, and a protective carbon overcoat, is submerged in the lubricant solution and then slowly withdrawn therefrom. In practicing the present invention, a conventional lifter-type dipper can be employed to submerge the composite in the lubricant solution. Embodiments of the present invention enable formation of functionally effective lubricant topcoats at a desirably low thickness of less than about 2.5 nm, such as about 1.0 nm to about 1.5, and even less than about 1.0 nm.

Given the objects of the present invention, the duration of submergence, the speed of withdrawal and the concentration of the lubricant solution can be optimized in a particular iteration to achieve a desired or optimal coating thickness.

Lubricant topcoats on magnetic recording media formed in accordance with the present invention have been evaluated with respect to fly stiction, ambient performance and stress CSS performance on thin film and magnetic recording disks. The results obtained were as good or better than those obtained employing conventional lubricants at higher topcoat thickness, as seen in FIGS. 3 through 5.

Figure 3:
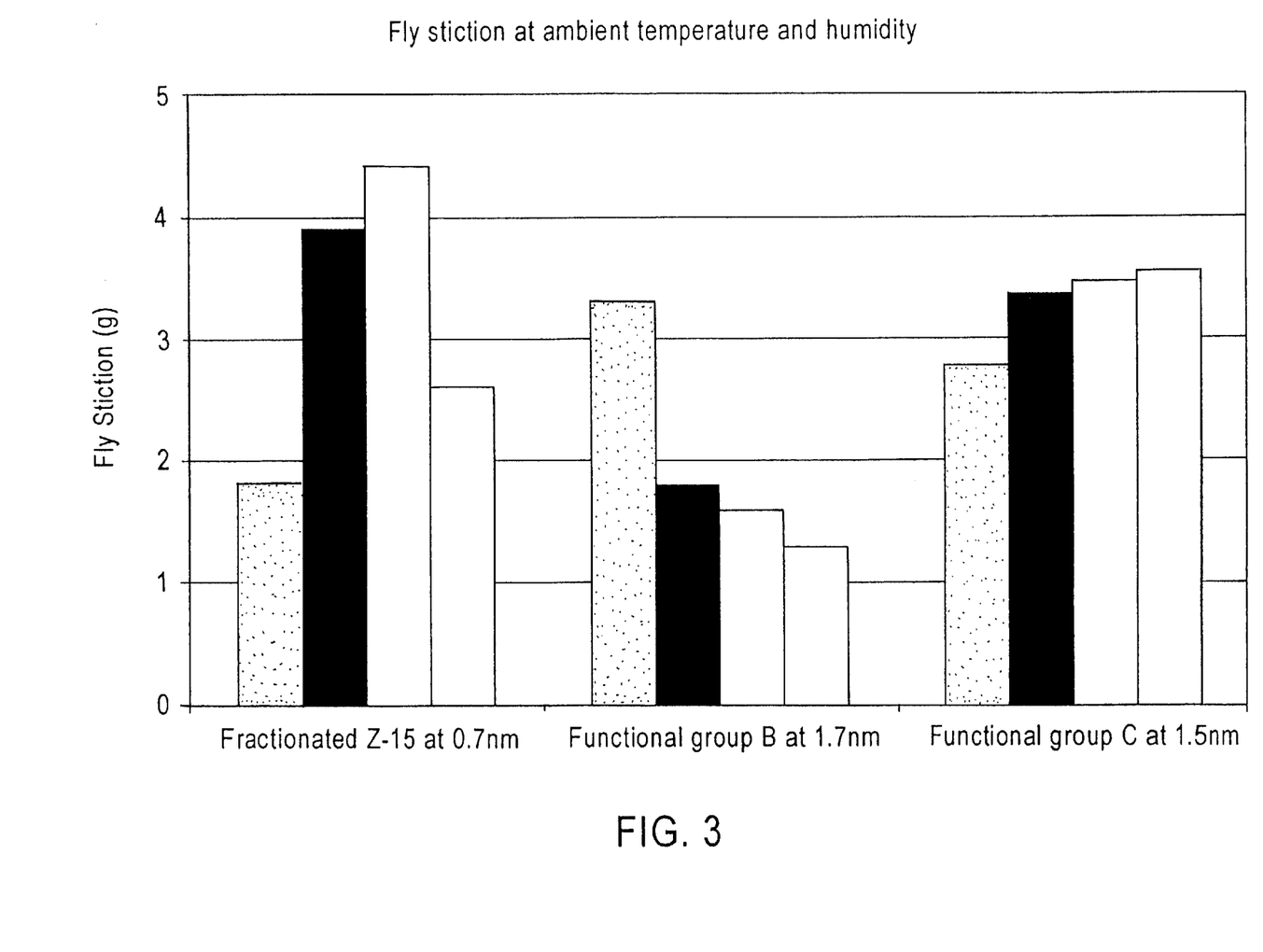
FIG. 3 is a graph comparing flystiction values of a lubricant of the present invention to those of two commercially available functionalized perfluoropolyether lubricants.
Figure 4:
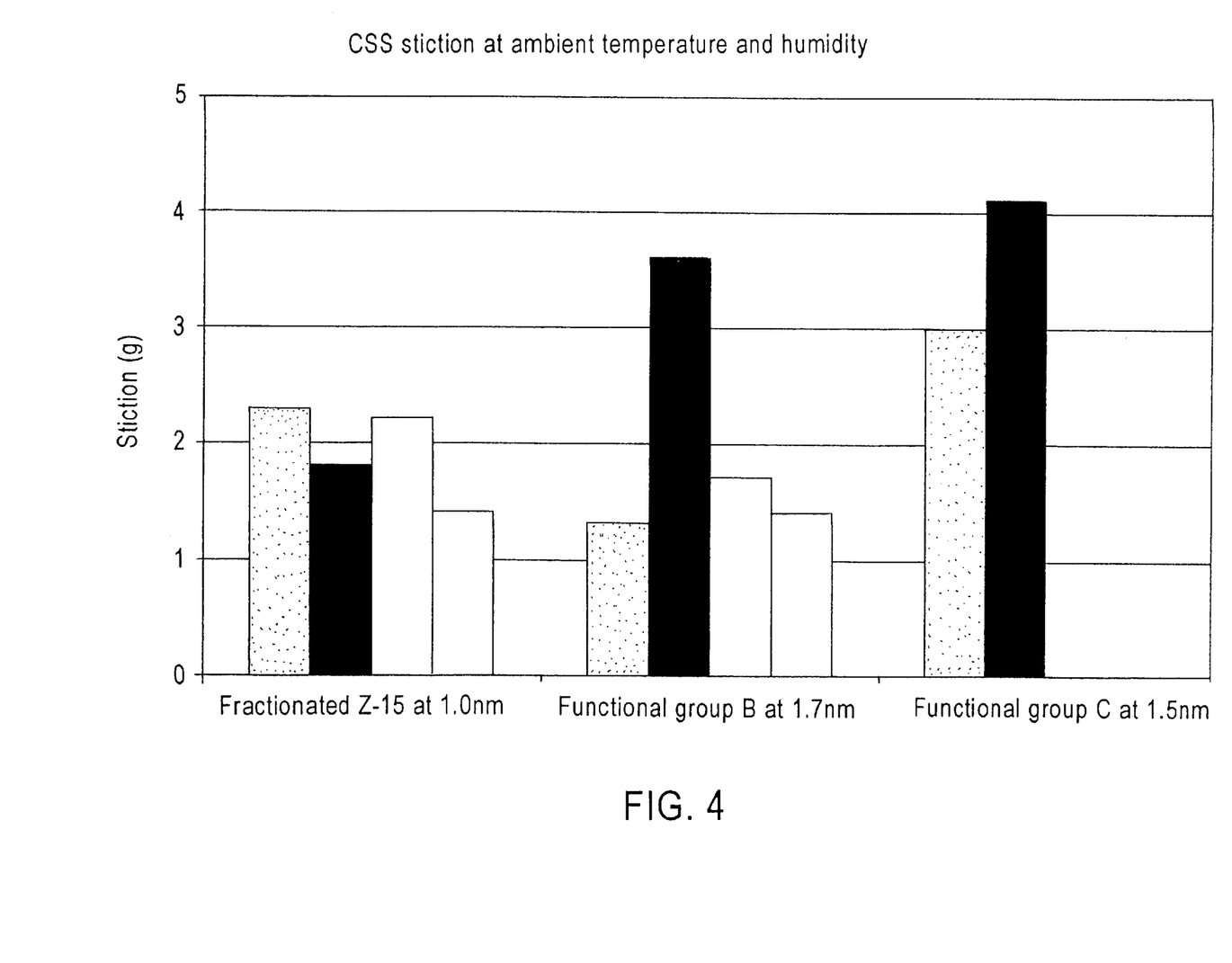
FIG. 4 comparatively demonstrates contact-start-stop (CSS) stiction results achieved using a lubricant of the present invention to conventional lubricants.
Figure 5:
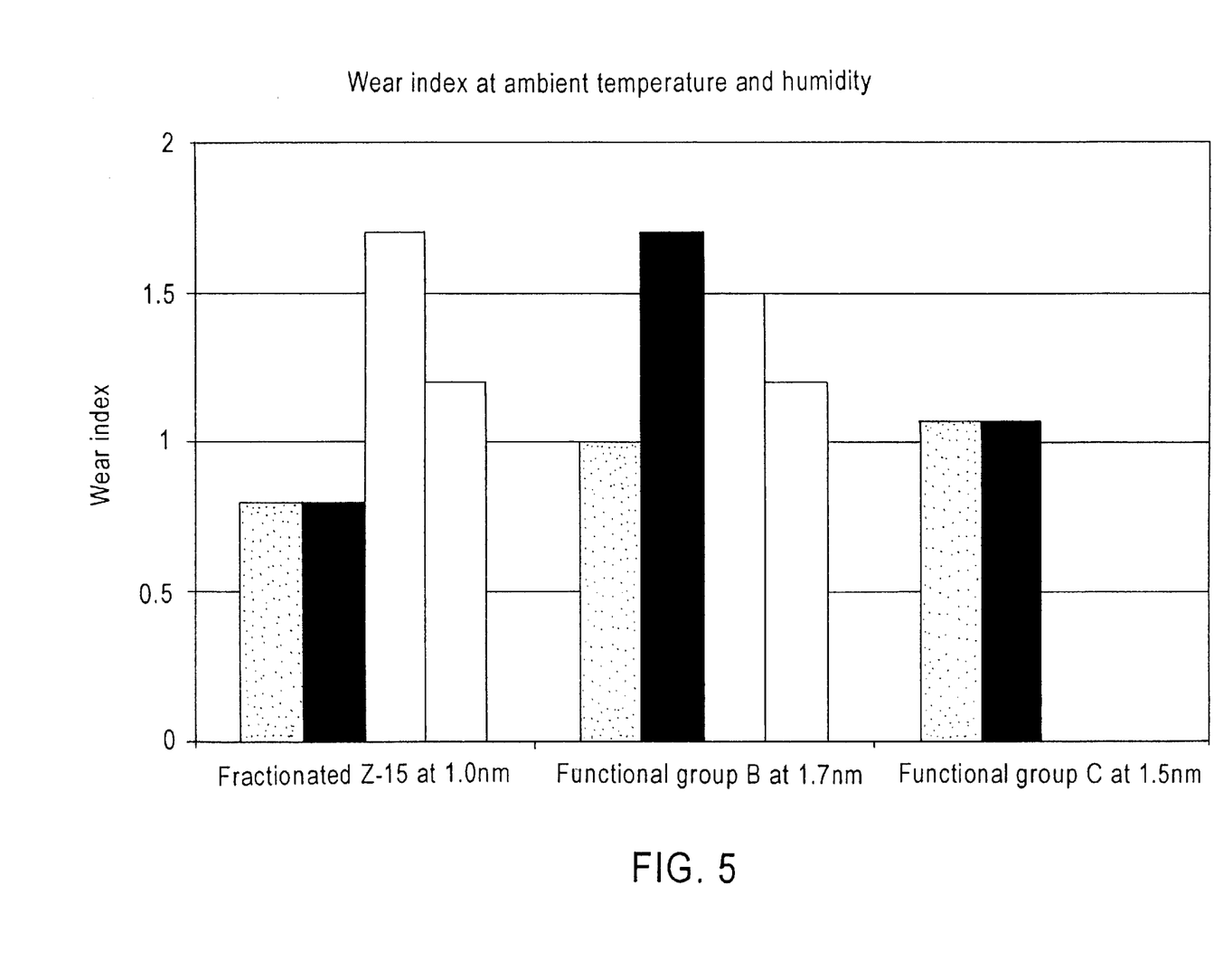
FIG. 5 is a graph depicting the CSS wear index results between a lubricant of the present invention to that of conventional lubricants.
Figure 6:
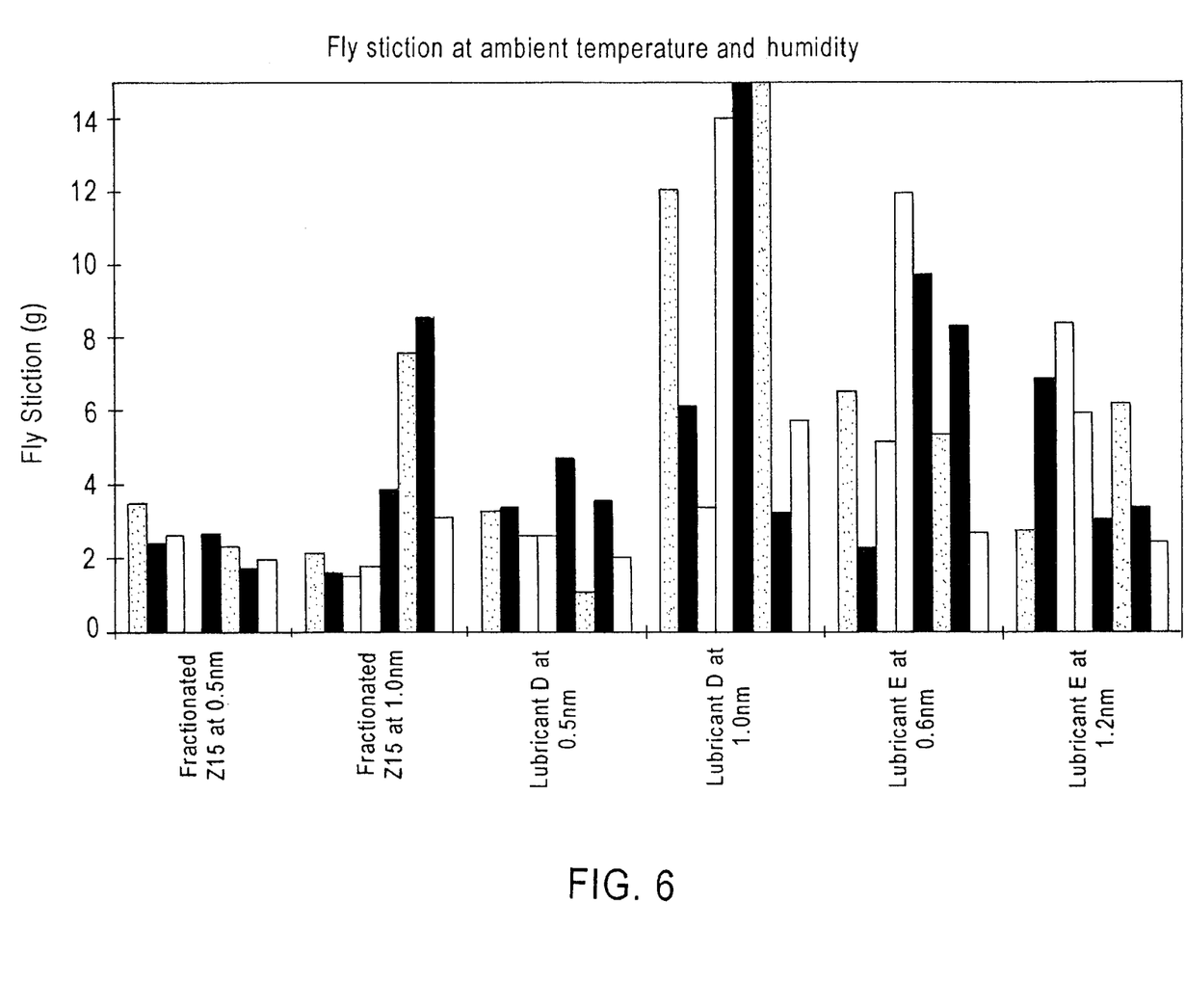
FIG. 6 comparatively demonstrates fly stiction performance using lubricants of the present invention to conventional lubricants.
Figure 7:
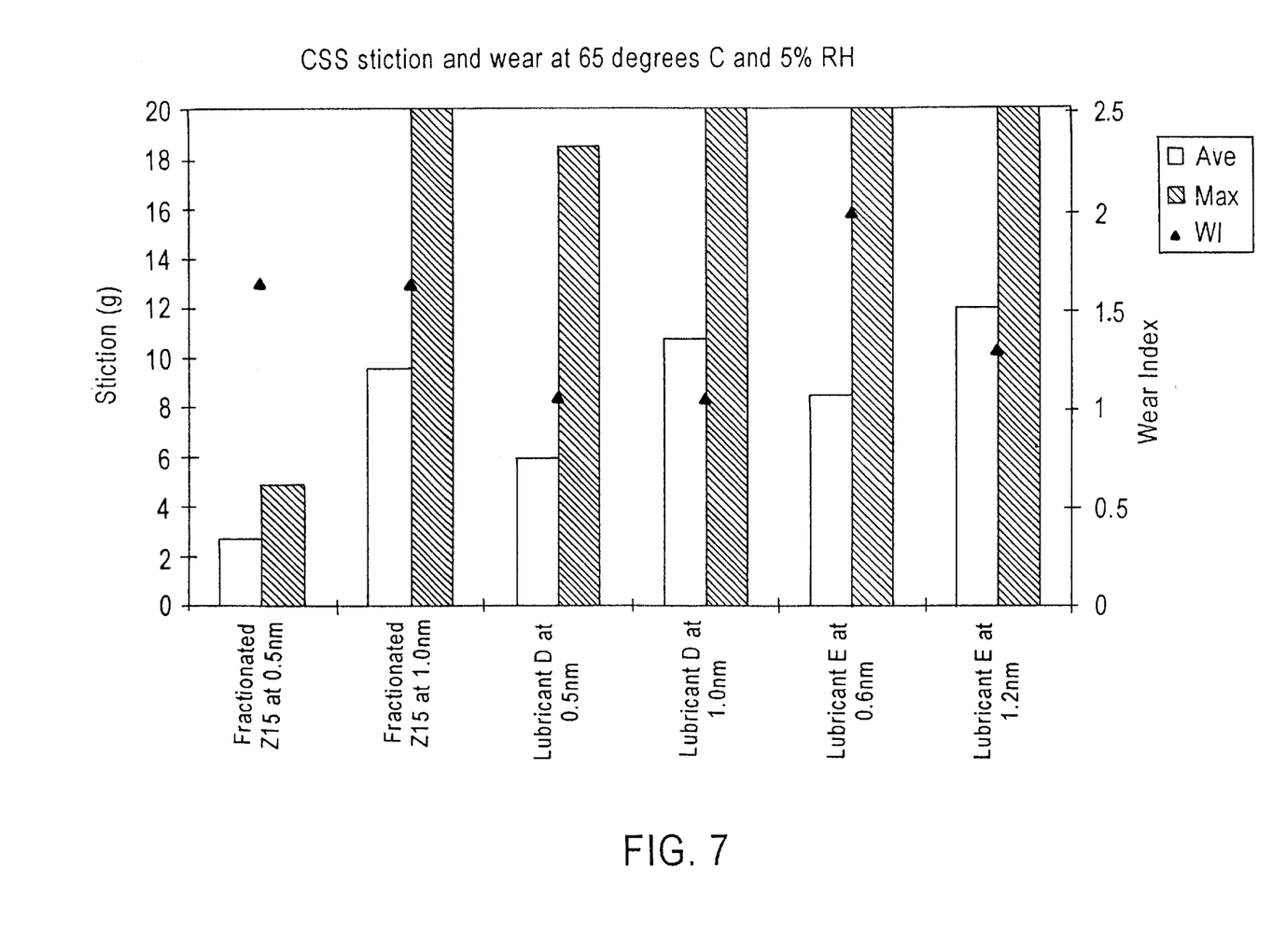
FIG. 7 is a graph comparing CSS stiction and wear performance of lubricants of the present invention to those of to conventional lubricants under conditions of 65° C. and 5% relative humidity.
Figure 8:
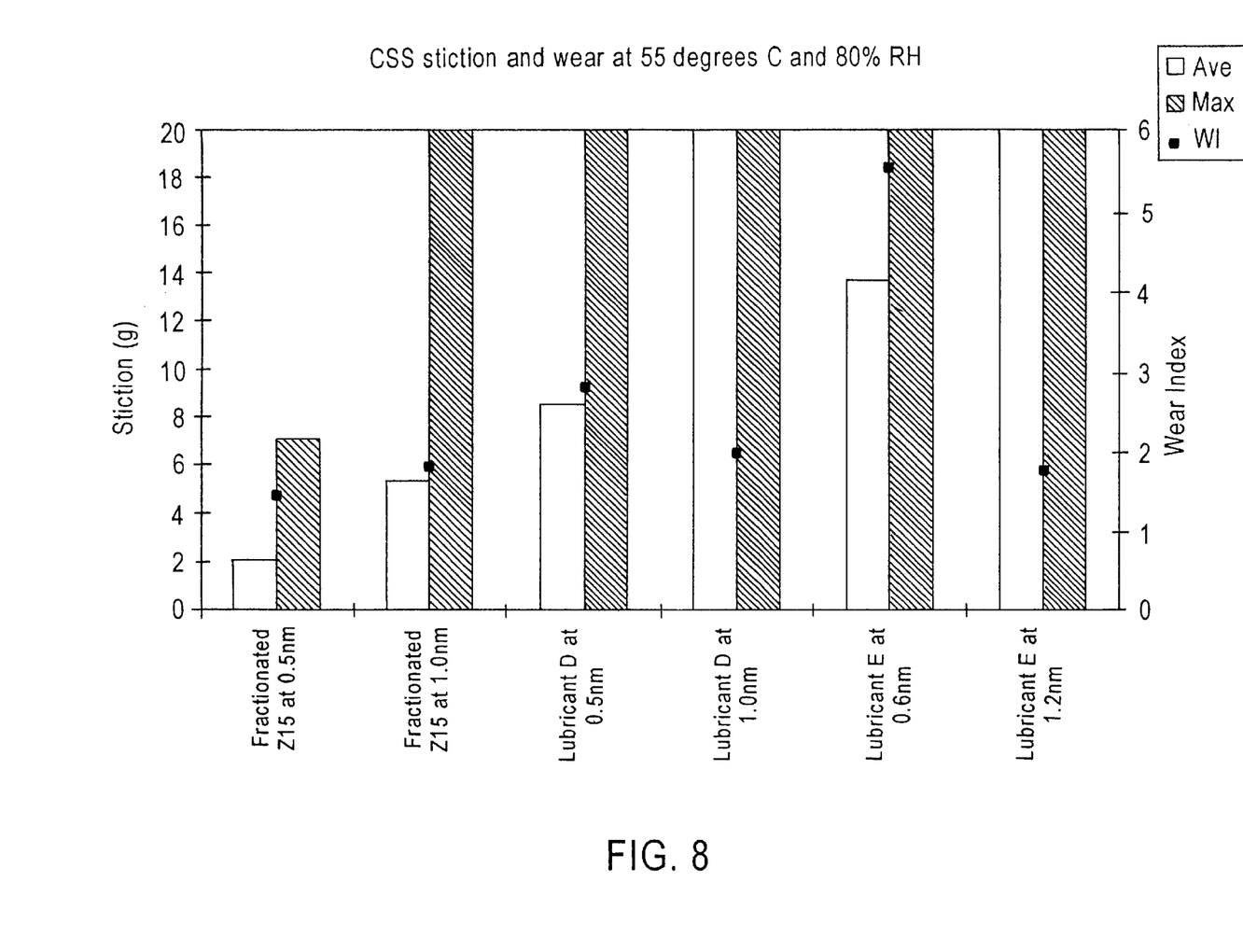
FIG. 8 comparatively demonstrates CSS stiction and wear performance of lubricants of the present invention to those of to conventional lubricants under conditions of 55° C. and 85% relative humidity.
Figure 9:
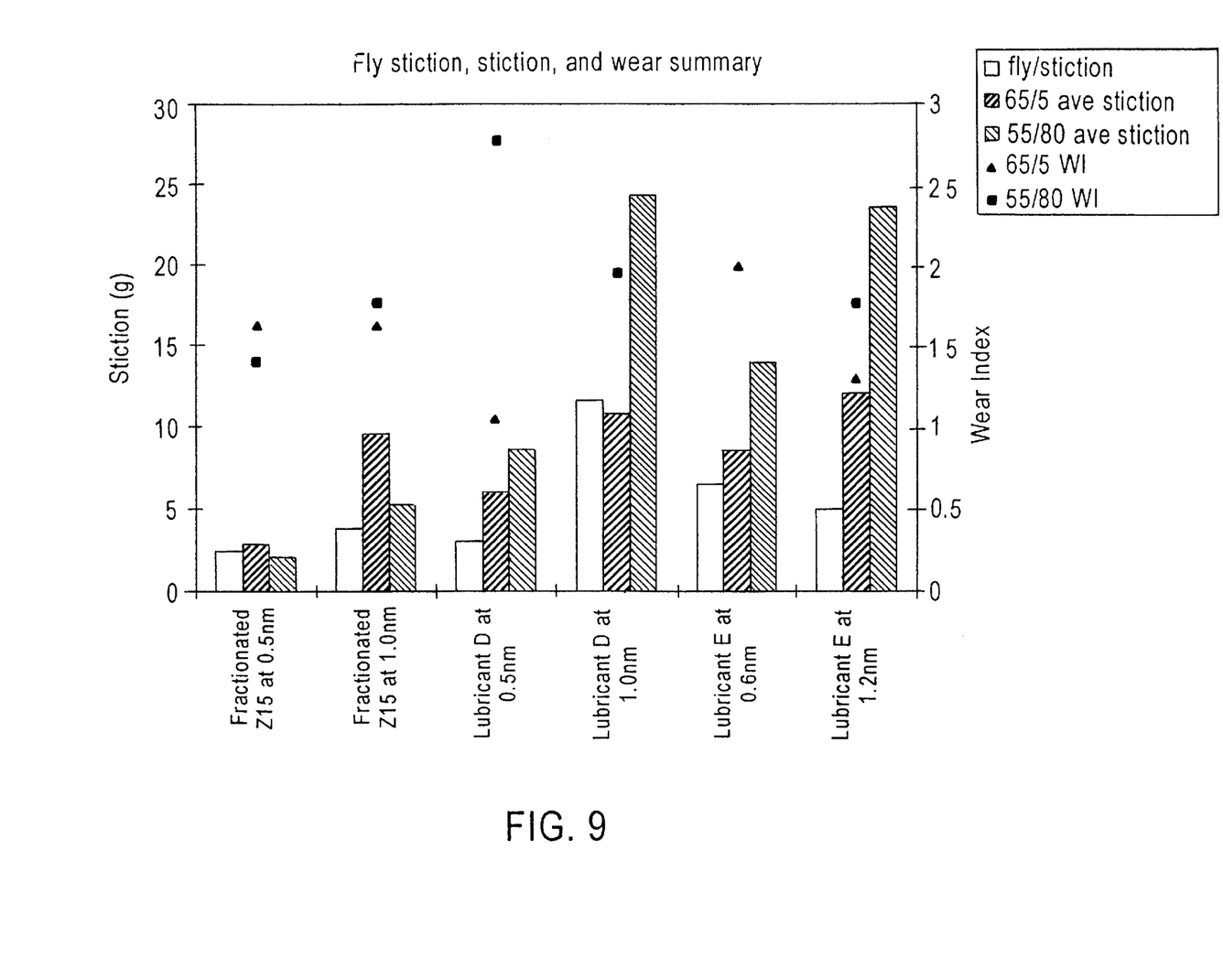
FIG. 9 comparatively summarizes fly stiction and stress CSS results achieved using lubricants of the present invention to conventional lubricants.

For example, under ambient conditions, CSS results of recording media having smooth surfaces and having a topcoat lubricant of the present invention with a thickness of about 1 nm or less provided fly stiction and CSS stiction values averaging 3 grams or less, as seen in FIGS. 3–4. Further, under conditions of high temperature and high relative humidity, CSS testing of smooth recording media having a topcoat lubricant in accordance with the present invention resulted better stiction performance, generally, and superior stiction performance under high relative humidity than that normally seen with conventional lubricants.

EXAMPLES

Figure 2:
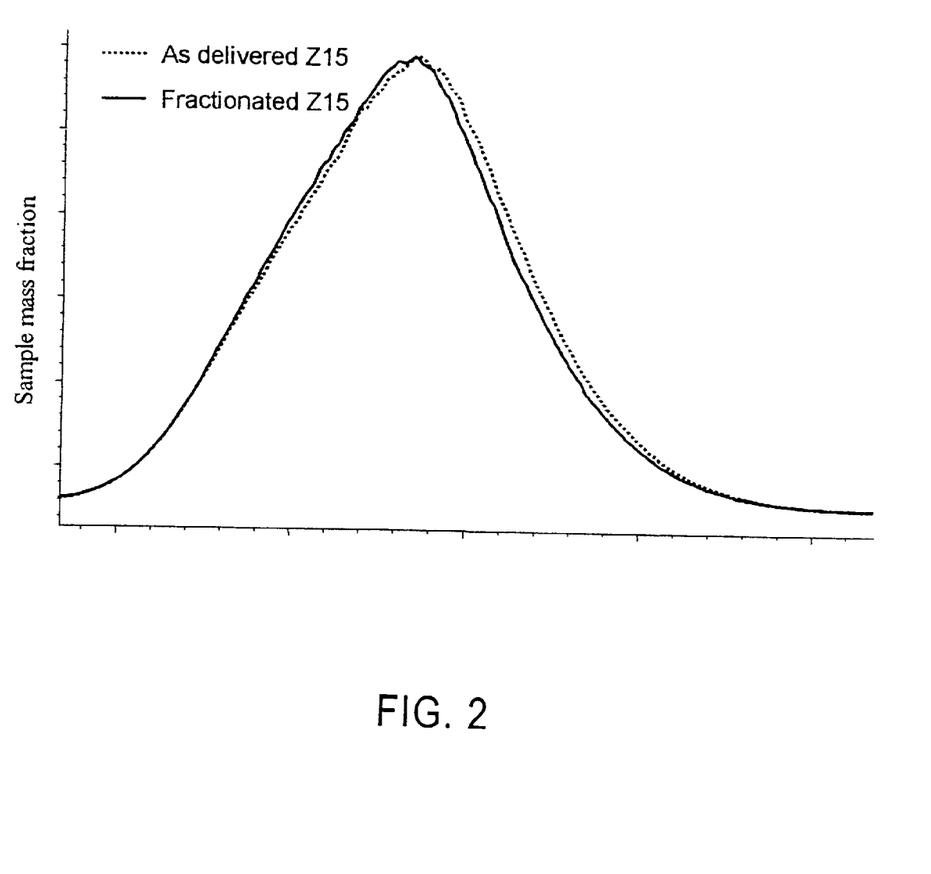
FIG. 2 presents comparative molecular weight distribution data of a fractionated non-functional fluoropolyether of the present invention to an untreated commercial product. The y axis is proportional to the mass fraction of the sample components and the x axis is proportional to the negative log of the molecular weight of the sample.

Commercially available Fomblin Z-15, a terminally nonfunctional perfluoroalkylpolyether obtained from Ausimont, having a mean molecular weight of about 9 kD to 10 kD was distilled at 285° C. and under about $10^{-3}$ Torr pressure to remove 4–5% (by weight) of the lightest molecular weight fractions. A comparative molecular weight distribution analysis is shown in FIG. 2, which compares the as delivered Fomblin Z-15 to its high-fraction molecular weight composition.

A lubricant solution for forming a lubricant topcoat on a magnetic recording medium was formed by simply dissolving a high-fraction terminally nonfunctional fluoropolyether lubricant produced in accordance with the present invention in a hydrofluorocarbon to produce a solution.

Advantageously, the lubricant solutions prepared in accordance with the present invention can easily be applied to a magnetic recording medium as, for example, to form lubricant topcoat 14 in the magnetic recording medium depicted in FIG. 1. In accordance with the present invention, the lubricant topcoat can be advantageously applied by submerging a disk in the lubricant solution and withdrawing the disk to form a lubricant topcoat thereon. Alternatively, the lubricant solution may be drained from the disk submerged in the lubricant solution.

A disk ready for application of a lubricant topcoat is immersed in and withdrawn from the lubricant solution. In this manner, a lubricant thickness of about 0.3 nm to about 5.0 nm is obtained, depending upon the formulation and the rate of withdrawal.

The present invention is not limited to any particular type of magnetic recording medium, but can be employed in any of various magnetic recording media, including those wherein the substrate or a subsequently deposited layer has been textured, as by mechanical treatment or laser techniques, and the textured surface substantially reproduced on subsequently deposited layers. Thus, a lubricant prepared in accordance with the present invention, can be applied to form a topcoat, such as topcoat 14 on the magnetic recording media depicted in FIG. 1, but not necessarily limited thereto.

Only the preferred embodiment of the invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. A magnetic recording medium comprising a lubricant topcoat having a thickness of less than 1 nm, wherein the lubricant topcoat consists essentially of a high-fraction, terminally non-functional fluoropolyether having an average molecular weight of 6,000 Daltons or greater, and wherein the high-fraction, terminally non-functional fluoropolyether is free of a low molecular weight fraction having a boiling point of less than 150° C. at a pressure of about $10^{-2}$ Torr and has end groups that are non-reactive and are selected from the groups consisting of alkyl, haloalkyl, alkoxy, haloalkoxy, aryl, and haloaryl groups.

2. The magnetic recording medium according to claim 1, wherein the high-fraction terminally nonfunctional fluoropolyether comprises a compound having the formula:

wherein:

A is alkyl, haloalkyl, alkoxy, haloalkoxy, aryl, or haloaryl;

B is alkyl, haloalkyl, aryl, or haloaryl;

$R^1$, $R^2$ and $R^3$ are independently $C_{1-10}$ fluoroalkyl, or $C_{1-10}$ perfluoroalkyl;

x is about 10 to about 500; and y and z are independently 0 or up to about 200.

3. The magnetic recording medium according to claim 2, wherein the high-fraction, terminally nonfunctional fluoropolyether is a compound having the formula:

wherein:

$R^1$ and $R^2$ are independently $C_{1-10}$ fluoroalkyl, or $C_{1-10}$, perfluoroalkyl; and n and m are individually about 10 to about 500.

4. The magnetic recording medium according to claim 1, wherein the high-fraction, terminally nonfunctional fluoropolyether has an average molecular weight of 6,000 to about 30,000 Daltons.

5. The magnetic recording medium according to claim 1, wherein the high-fraction terminally nonfunctional fluoropolyether has a boiling point of 285° C. or greater at a pressure of about $10^{-3}$ Torr.

6. The magnetic recording medium according to claim 1, wherein the lubricant topcoat has a thickness of about 0.5 nm.

7. The magnetic recording medium according to claim 1, wherein the high-fraction, terminally nonfunctional fluoropolyether is a terminally nonfunctional perfluoroalkylpolyether.

8. The magnetic recording medium according to claim 1, comprising:

a substrate;

an underlayer on the substrate;

a magnetic layer on the underlayer; and the lubricant topcoat on the magnetic layer.

9. The magnetic recording medium according to claim 8, further comprising a protective overcoat on the magnetic layer and the lubricant topcoat on the protective overcoat.

10. The magnetic recording medium according to claim 1, wherein the lubricant topcoat consists of the high fraction, terminally non-functional fluoropolyether.

11. The magnetic recording medium according to claim 1, wherein the high fraction, terminally non-functional fluoropolyether is obtained by distilling a terminally non-functional fluoropolyether at a temperature of about 150° C. to about 290° C. and at a pressure of about $10^{-2}$ Torr to about $10^{-4}$ Torr to remove a low molecular weight fraction from the terminally non-functional fluoropolyether.

12. The magnetic recording medium according to claim 1, wherein the lubricant topcoat has a contact-start-stop stiction value of 3 grams or less.

13. A method of manufacturing a magnetic recording medium, the method comprising:

depositing a magnetic layer on a substrate; and depositing a lubricant on the magnetic layer to form a lubricant topcoat having a thickness of less than 1 nm; wherein the lubricant topcoat consists essentially of a high-fraction, terminally non-functional fluoropolyether having an average molecular weight of 6,000 Daltons or greater, and wherein the high-fraction, terminally non-functional fluoropolyether is free of a low molecular weight fraction having a boiling point of less than 150° C. at a pressure of about $10^{-2}$ Torr and has end groups that are non-reactive and are selected from the groups consisting of alkyl, haloalkyl, alkoxy, haloalkoxy, aryl, and haloaryl groups.

14. The method according to claim 13, further comprising fractionating a terminally nonfunctional fluoropolyether lubricant to obtain the high-fraction, terminally nonfunctional fluoropolyether lubricant.

15. The method according to claim 14, wherein the fractionating step comprises distilling the terminally nonfunctional fluoropolyether lubricant within the temperature range of about 150° C. to about 290° C. and within a pressure range of about $10^{-2}$ Torr to about $10^{-4}$ Torr.

16. The magnetic recording medium according to claim 13, wherein the high-fraction, terminally nonfunctional fluoropolyether has a boiling point of 285° C. or greater at a pressure of about $10^{-3}$ Torr.

17. The method according to claim 13, wherein the high-fraction terminally nonfunctional fluoropolyether is a compound having the formula:

wherein:

A is alkyl, haloalkyl, alkoxy, haloalkoxy, aryl, or haloaryl;

B is alkyl, haloalkyl, aryl, or haloaryl;

$R^1$, $R^2$ and $R^3$ are independently $C_{1-10}$ fluoroalkyl, or $C_{1-10}$ perfluoroalkyl;

x is about 10 to about 500; and y and z are independently 0 or up to about 200.

18. The method according to claim 17, wherein the high-fraction terminally, nonfunctional fluoropolyether is a compound having the formula:

wherein:

$R^1$ and $R^2$ are independently $C_{1-10}$ fluoroalkyl, or $C_{1-10}$ perfluoroalkyl; and n and m are individually about 10 to about 500.

19. The method according to claim 13, wherein the high-fraction, terminally nonfunctional fluoropolyether has an average molecular weight of 6,000 to about 30,000 Daltons.

20. The method according to claim 13, wherein the lubricant topcoat has a thickness of about 0.5 nm.

21. The method according to claim 13, wherein the lubricant topcoat consists of the high fraction, terminally non-functional fluoropolyether.

22. The method according to claim 13, wherein the high fraction, terminally non-funtional fluoropolyether is obtained by distilling a terminal non-funtional fluoropopyether at a temperature of about 150° C. to about 290° C. and at pressure of about $10^{-4}$ Torr to remove a low molecular weight fraction from the terminally non-funtionally fluoropolyether.

* * * * *